Nov. 17, 1959   F. O. RICE   2,913,316
APPARATUS FOR DETERMINING THE VOLUME OF
A GAS IN A LIQUID OR GASEOUS MIXTURE
Filed July 5, 1956
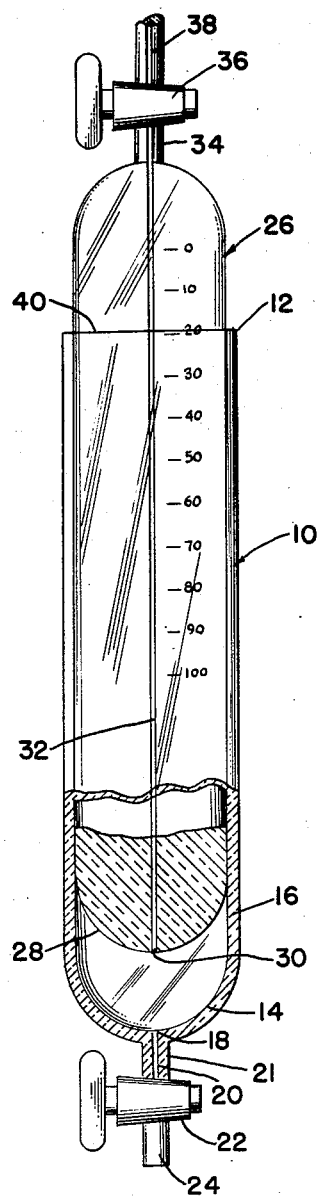
INVENTOR
FRANCIS O. RICE
BY *Beale and Jones*
ATTORNEYS

2,913,316

APPARATUS FOR DETERMINING THE VOLUME OF A GAS IN A LIQUID OR GASEOUS MIXTURE

Francis Owen Rice, Washington, D.C.

Application July 5, 1956, Serial No. 596,039

2 Claims. (Cl. 23—256)

This invention relates to a method and apparatus for measuring the change in volume of a gas as a result of a reaction.

More specifically, this invention relates to an apparatus and method for using the apparatus for the rapid estimation of a constituent in solution in cases where the particular constituent can be made to evolve a gas, the volume of said gas, being an indication of an amount of a particular constituent. This invention also relates to an apparatus and the method of using said apparatus for the rapid analysis of gaseous mixtures.

Heretofore, the apparatus for making such analysis has been cumbersome and expensive. The method for using such apparatus has been complicated and involved. The ordinary apparatus for measuring the reaction of gases comprises a measuring burette and a leveling bulb containing a liquid, the purpose of which is to permit the gas to be brought to a desired pressure, usually atmospheric, before the volume is read. The apparatus used in the prior art is normally made still more cumbersome by the various reaction and absorption pipettes attached to the measuring bulb, each containing a specific reagent. Although it is advantageous to have absorption pipettes containing a large quantity of the agent so that many absorptions can be made without renewing the reagent, there is a drawback that in any particular analysis, one is not sure whether the reagent used is at or near exhaustion.

The foregoing objections are overcome by my novel apparatus and method for measuring the amount of a constituent from the gas volume change after a reaction. This apparatus, briefly, consists of an open end cylinder having a plunger therein and means for first introducing a solution or a gaseous mixture into the cylinder; and, in turn, a material which acts upon the solution or gaseous mixture. In the case of a solution the second material introduced reacts with the solute to form a gas which may be measured at atmosphere pressure and this fact used to determine the amount of the gas forming material originally present in the solution. In the case of an aqueous mixture the material added either absorbs or reacts, selectively, with one component of the mixture to remove that component therefrom. The volume of the remaining gas may be measured at atmospheric pressure and the amount of the component removed determined by difference.

An object of my invention is to produce an apparatus which is extremely simple, being easily made and maintained. Its simplicity makes it easy to clean and also easy to handle and operate as well as to transport.

Another object of my invention is to provide a device which in spite of its simplicity and economy of manufacture can accurately measure the change in volume of a gas.

A further object of my invention is to provide a measuring device which is easy to operate, utilizing a method which does not require the presence of expensive laboratory measuring devices used heretofore.

Another object of my invention is to provide an apparatus comprising a chamber with a gas tight plunger, said chamber having means to introduce liquids or gases which react or are absorbed to increase or reduce the amount of gas present in the apparatus and means for adjusting the pressure within the apparatus to determine the change in volume of the gas.

Other objects will appear from the following description, reference being had to the accompanying drawing in which The figure shows the preferred embodiment of my invention in perspective view with a bottom portion of the cylinder broken away to reveal the lower end of the plunger which likewise has been broken away to show the construction through its midsection.

Referring more specifically to the drawing, my apparatus comprises a cylinder or chamber 10 which may be made of any material which will not react with the substances with which the device is to be used but which is preferably made of a transparent material such as glass. The top of the cylinder is open as at 12 and the floor 14 is concave in shape, curving inwardly at the base of the straight inside walls 16. At the center of the floor 14 is disposed an outlet 18 which communicates through capillary channel 20 in the neck 21 to the first or cylinder stopcock 22. Regardless of the composition of the cylinder, the neck 21 must be of transparent material to enable the operator to see the liquid level in the channel 20. The stopcock 22 is the conventional rotary type well known in the laboratory. A short open section of tube 24 is disposed on the outlet side of the stopcock 22.

The other primary part of the apparatus is the cylindrical plunger 26 which has straight walls and is designed to fit in gas-tight relation inside the cylinder as shown. The lower or working end 28 of the plunger 26 is preferably convex in shape to conform closely to the floor 14 of the cylinder. The lowermost end of the plunger 26 is provided with an opening 30 which communicates through a capillary channel 32 extending longitudinally of the plunger and through a short neck 34 to the second or plunger stopcock 36, similar in construction to the first stopcock 22. A short length of tube 38 is disposed on the outlet side of the second stopcock 36.

In the preferred embodiment the capillary channels 20 and 32 are in the range of 0.05 to 1.0 millimeter in diameter. The cylinder or the plunger is accurately graduated to indicate the volume enclosed in the cylinder by the plunger. In the embodiment shown in the drawing, the plunger is graduated with the valve of the numerals increasing toward the lowermost end of the plunger. The volume may be read at the upper edge 40 of the cylinder which overlies the scale. Similarly, the cylinder itself may be graduated along the outside with numerals increasing in value toward the floor of the cylinder. An index or reference line etched on the plunger surface may be seen through the transparent cylinder to read the volume.

As an example of the use of my apparatus I will describe the exact determination of hydrogen peroxide of 3% strength such as is sold in most drug stores. The apparatus is first washed out thoroughly, the cylinder stopcock 22 is closed and the apparatus is held vertically without the plunger. An accurately measured amount of the hydrogen peroxide solution is run into the cylinder 12 from a pipette, taking care that the hydrogen peroxide is introduced at the bottom of the cylinder. The plunger, with its stopcock 36 open, is then pushed down the cylinder near to, but not touching, the surface of the hydrogen peroxide. The plunger stopcock 36 is then closed, the apparatus is inverted, the cylinder stopcock 22 is opened and the plunger is pushed in until all the air is displaced and the hydrogen peroxide solution comes to some fixed point which may conveniently be near the cylinder stopcock. This stopcock is then closed. The small remaining volume of air in the tube may be neglected or a suitable correction may be made.

The apparatus is again inverted so that the cylinder stopcock is below and an excess of a suitable liquid, such as acid permanganate, acid sodium hypochlorite, etc. is quickly drawn into the cylinder by momentarily opening and closing the stopcock 22 while pulling upward on the plunger 26.

After the gas has completely evolved, the lower portion of the apparatus, namely, the cylinder stopcock is submerged in a liquid so that the line of the liquid comes to some point on the neck 21. The cylinder stopcock 22 is then opened and the plunger is pressed downwardly until the level of the solution in the capillary channel 20 coincides with the level of the liquid outside of the apparatus. This means that the gas within the apparatus is at atmospheric pressure.

The volume of the gas in the apparatus may then be read from the graduating marks.

This method of analysis is of wide application and may be used in any reaction which evolves a gas. The amount of gas, which is exactly determined by its volume at a known pressure and temperature, is a quantitative measure of the constituent which is present in smaller amount. Thus, while the preceding example describes a way of analyzing for hydrogen peroxide in an aqueous solution with say potassium permanganate, the method may be equally well used for the standardization of potassium permanganate by adding an excess of aqueous hydrogen peroxide to a measured volume of aqueous potassium permanganate and measuring the liberated oxygen.

Many other examples of the use of this method may be given. Ammonia, urea, etc. may be estimated by reaction with calcium hypochlorite in which nitrogen is evolved. Hydrazine may be estimated by many reactions such as the decomposition with bromate ion, iodic acid, potassium ferricyanide, iodine and potassium hydroxide, etc. Nitrate ion may be estimated by its reaction with ferrous ion to give nitric oxide and similarly nitrite ion may be estimated by its reaction with iodide ion to give also nitric oxide. The well known method of Van Slyke for determining amino nitrogen by measurement of the nitrogen gas evolved in the reaction

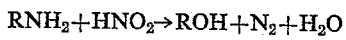
$$RNH_2 + HNO_2 \rightarrow ROH + N_2 + H_2O$$

may very conveniently be carried out in this apparatus. Hydroxylamine may be determined by its reaction with ferric ion, evolving nitrous oxide according to the equation:

$$2NH_2OH + 4Fe^{+++} \rightarrow N_2O + 4Fe^{++} + H_2O + 4H^+$$

The foregoing are only a few examples showing the wide applicability and usefulness of this method for the rapid and precise estimation of a wide variety of chemical substances.

The method is also applicable to the analysis of gaseous mixtures. In order to analyze a single constituent of a gaseous mixture, the apparatus is first washed out and the plunger, with its stopcock 36 closed and the cylinder stopcock 22 open, is pushed to the bottom of the cylinder so as to expel all air and the cylinder stopcock is closed. The plunger stopcock 36 is opened and connected to a source of supply of a gas to be analyzed, which is drawn into the apparatus and the plunger stopcock is closed. If the pressure of the gas is not atmospheric, it is brought to atmospheric pressure in the manner described and its volume measured. A few cubic centimeters of a suitable absorbing liquid is drawn into the apparatus through the cylinder stopcock, the apparatus is shaken vigorously a few times and the new volume of gas is measured in the manner previously described. The contraction is a measure of the particular constituent. If it is desired to analyze for a second constituent of the gas mixture, it is transferred to a second gas analyzer which has been washed out and prepared as before. This may be done conveniently by connecting the plunger stopcock of the second gas analyzer to the cylinder stopcock of the analyzer containing the sample which may then be completely transferred. After disconnecting, the sample can then be analyzed for a second constituent in the manner previously described.

If it is desired to analyze for a third constituent of the gas mixture, it is transferred to the original gas analyzer which has been washed out and prepared as previously described and the third analysis is made. Subsequent analyses may be made in the same way.

A particular advantage of this apparatus is that it may be used to analyze for many gases such as ammonia, hydrogen chloride, etc. which are very soluble in water. The original gas sample is drawn into the dry apparatus and the volume is read immediately if the original gas sample is at atmospheric pressure. If not, the gas is brought to a pressure slightly in excess of atmospheric, the cylinder stopcock 22 is opened momentarily to allow the gas to come to atmospheric pressure and the volume is read. The ammonia, hydrogen chloride, etc. can then be absorbed by a suitable solvent, the gas brought to atmospheric pressure in the manner previously described and the new volume read. From the contraction, the amount of absorbed gas in the original mixture may be calculated. Corrosive gases such as chlorine, nitrogen dioxide, hydrogen sulfide, etc. which attack mercury, may be estimated in a similar way.

Thus I have invented a simple and inexpensive apparatus which is easy to operate and which produces exceptionally accurate results. It is especially adapted to measure the change in volume of a gas as a result of a reaction. Its simplicity represents a marked advance in the prior art dealing with apparatus for determining volume of a gas.

It should be understood that features of the structure and method described above may be varied within the scope of the appended claims and still be covered by this invention. For instance, the working end of the plunger and the floor of the cylinder may be flat, or the cross section of the cylinder and plunger may be changed from circular to square. Also the plunger need not be solid but may be hollow with a capillary tube formed therein to extend along the axis from one end to the other of the plunger.

I claim:

1. An analytical apparatus for determining the volume of gaseous components present in a gaseous mixture and a gaseous product produced by a reaction between a solute and an agent reactive therewith to form said gaseous product, said apparatus comprising a cylinder, said cylinder having inside walls and a floor, and a cooperating plunger fitting within the cylinder in gas-tight relation, said plunger having side walls and a working end, the interior of said cylinder corresponding in shape with the walls and the working end of said plunger, said cylinder having a transparent capillary outlet tube from the floor thereof and extending on an axis coaxial with the axis of the cylinder, said transparent capillary outlet tube communicating with a first stop cock, said plunger having a capillary bore extending longitudinally thereof terminating at one end in an opening in the working end of said plunger and communicating with a second stop cock.

2. An analytical apparatus as described in claim 1 wherein said floor is concave in shape and said working end is convex in shape.

References Cited in the file of this patent

UNITED STATES PATENTS

| 464,543 | Wolpert | Dec. 8, 1891 |
| 1,714,197 | Fourtellotte | May 21, 1929 |
| 2,019,950 | Bunzell | Nov. 5, 1935 |
| 2,357,638 | Dwyer | Sept. 5, 1944 |

OTHER REFERENCES

Barkley et al.: Bureau of Mines, Bulletin 91, 1916, pp. 36, 37.